(No Model.) 2 Sheets—Sheet 1.
B. J. MALMFELT.
MACHINE FOR SOLDERING SHEET METAL CANS.
No. 499,389. Patented June 13, 1893.
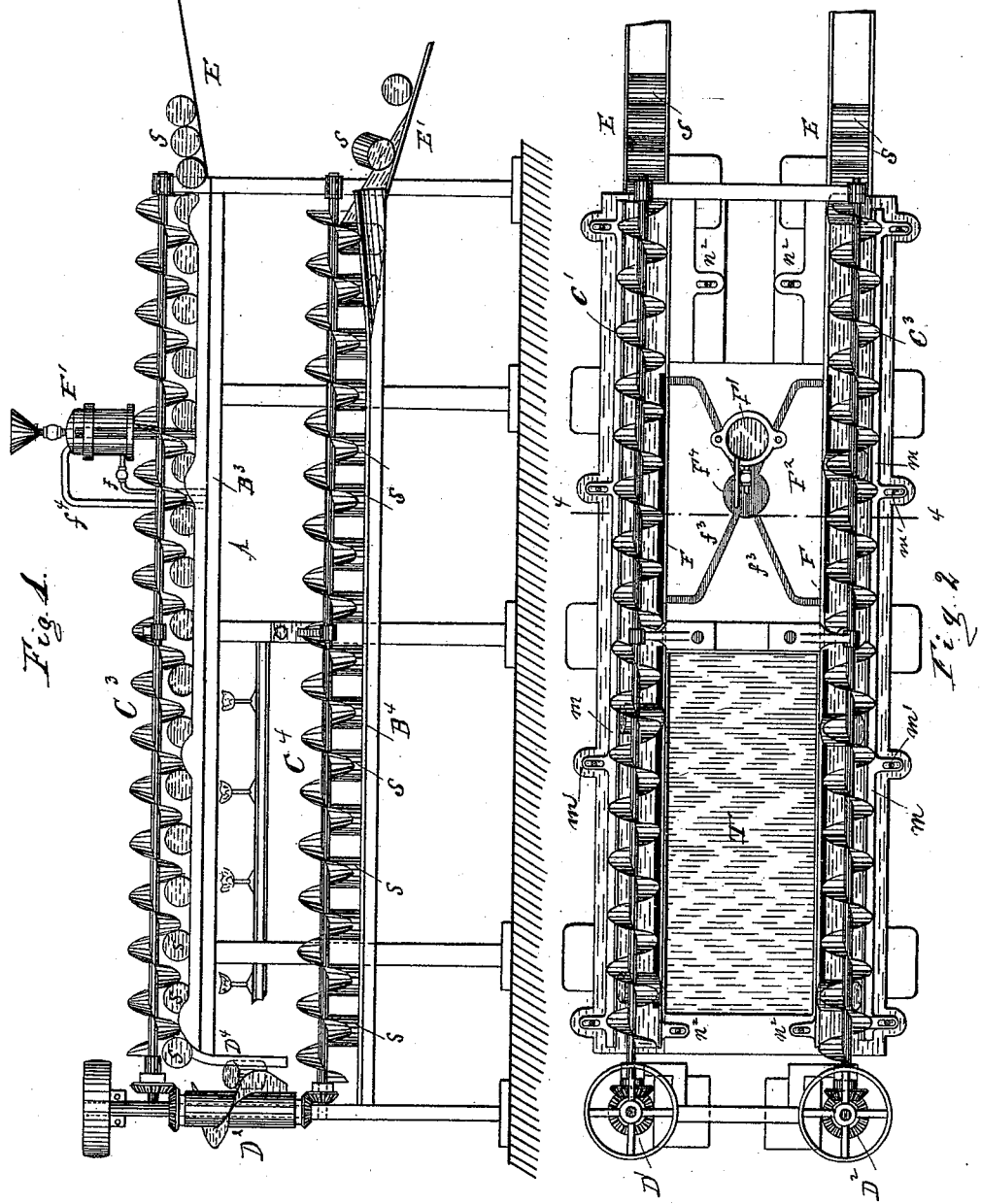
WITNESSES:
INVENTOR
ATTORNEYS.

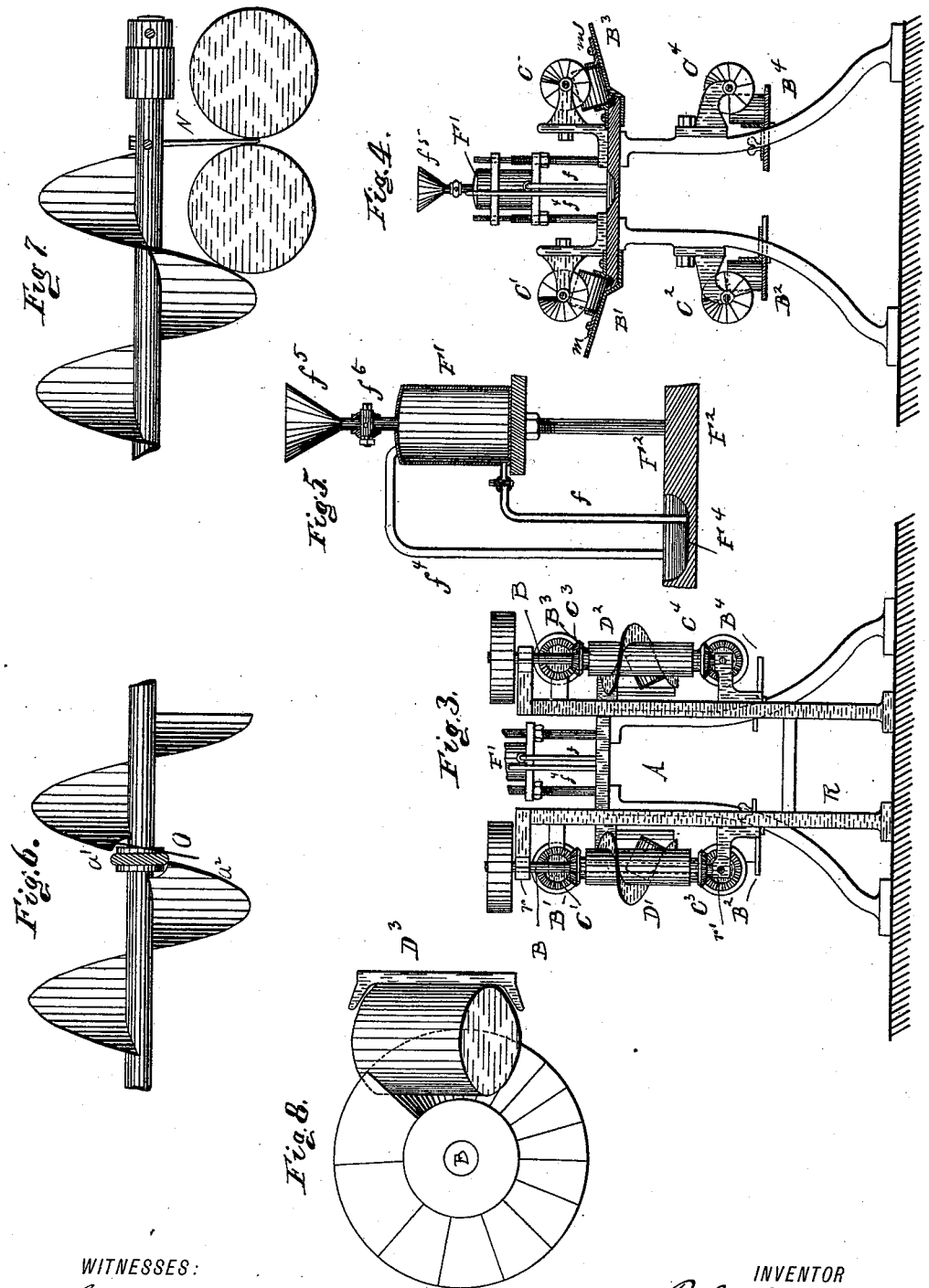

UNITED STATES PATENT OFFICE.

BENNET J. MALMFELT, OF NEW YORK, N. Y.

MACHINE FOR SOLDERING SHEET-METAL CANS.

SPECIFICATION forming part of Letters Patent No. 499,389, dated June 13, 1893.

Application filed February 12, 1891. Renewed February 23, 1892. Again renewed April 13, 1893. Serial No. 470,257.

(No model.)

*To all whom it may concern:*

Be it known that I, BENNET J. MALMFELT, a citizen of the United States, residing in the city, county, and State of New York, have invented certain new and useful Improvements in Machines for Soldering Sheet-Metal Cans, of which the following is a specification.

This invention relates to an improved machine for soldering sheet metal cans in an automatic manner by a continuous process; and the invention consists of a machine for soldering sheet metal cans, which comprises a horizontal platform for the cans, a spiral conveyer for rolling the cans over said platform, an acid-trough through which the rims of the cans are passed, an acid-vessel for supplying acid to said trough, and a second or solder trough in line with the acid-trough. The cans are conducted from the platform on a downwardly-bent guide-arm and vertical spiral conveyer to a second platform arranged vertically below the first platform and its second spiral conveyer, which moves the cans over the platform on end, so as to produce their cooling in their passage over the platform. The machine is perfectly arranged in duplicate, so as to solder one rim of a can, while passing along one half of the machine, and the other rim of the can while passing along the other half of the machine.

The invention also consists in the construction and combination of parts and details, as will be fully described hereinafter and finally be pointed out in the claims.

In the accompanying drawings, Figure 1 represents a side-elevation of my improved machine for soldering sheet metal cans. Fig. 2 is a plan view of the same. Fig. 3 is an end-elevation of the machine showing the vertical conveyers by which the cans are conducted from the upper to the lower platforms, parts being broken out. Fig. 4 is a vertical transverse section of the machine through the acid trough, taken on the line 4, 4, Fig. 2. Fig. 5 is a detail vertical section of the acid-supply vessel. Figs. 6 and 7 are details of the horizontal conveyers for the cans, and Fig. 8 is a top-view of the vertical conveyer, upon a larger scale, by which the cans are transmitted from the upper to the lower platforms.

Similar letters of reference indicate corresponding parts.

Referring to the drawings, A represents the supporting frame of my improved machine for soldering sheet metal cans. It is made of sufficient length to provide for soldering a fixed number of cans and is provided with four platforms $B'$, $B^2$, $B^3$ and $B^4$, which are arranged symmetrically to the longitudinal axis of the machine, the platforms $B^2$ and $B^4$ being arranged respectively vertically below the platforms $B'$, $B^3$, as shown in Figs. 3 and 4.

Above each platform is arranged a horizontal spiral-conveyer $C'$, $C^2$, $C^3$, $C^4$ respectively, which are supported in suitable bearings in the frame A and to which rotary motion in the upper direction is imparted from vertical shafts B at one end of the machine by bevel cog-wheels, as shown in Figs. 1 and 3. The vertical shafts B are to receive motion by a suitable belt and pulley transmission from a power-shaft.

On the vertical shafts B, which are located in the same vertical planes with the shafts $C'$, $C^2$, $C^3$ and $C^4$ are arranged vertical conveyers, $D'$, $D^2$, formed by spiral blades placed on rollers of suitable thickness, which spiral blades in connection with the downwardly-bent and flanged guide-arms or channels $D^3$, $D^4$ conduct the cans D from the upper to the lower platforms. The spiral conveyers $C'$, $C^3$, of the upper platforms $B'$, $B^3$, are moved in one direction, while the spiral conveyers $C^2$, $C^4$, of the lower platforms $B^2$, $B^4$ are moved in the opposite direction to the former, so that the cans are moved from one end of the machine along the upper platform and back in opposite direction. The cans are supplied to the upper conveyer $B'$ by a suitable inclined chute E and are then taken up by the blades of the upper conveyer and rolled forward along the obtusely-angled upper platform $B'$. The inner edge rims of the cans are then dipped into acid-troughs F which are arranged at the inner edges of the inclined platforms $B'$, $B^2$, and supplied with acid from an acid-supply vessel $F'$ which is supported at a suitable height above the machine and connected by a supply-pipe $f$ with the central depression $F^4$ in a transverse table $F^2$ of the supporting frame A. From the depression or central trough $F^4$ the diagonal channels $f^3$ extend to the ends of the troughs F, so as to supply the acid from the acid-vessel to the troughs at both sides of the table $F^2$. A vent-pipe $f^4$ extends from the upper part of the acid-vessel F' downward to the level of the acid in the depression F⁴, so that as soon as its level is reached, further access of air is prevented and the supply of acid interrupted. The acid-vessel F' is supplied with acid by means of a funnel $f^5$ and a valve supply-pipe $f^6$, as shown clearly in Fig. 5. By the connection of the acid-vessel by a supply-pipe $f$ and vent-pipe $f^4$ with the central acid-depression F⁴ a regular supply of acid is always kept up in the troughs F, so that the uniform dipping of the rims of the cans in the acid is kept up. From the acid troughs the cans are passed into the soldering troughs T which are arranged in line with the acid-troughs transversely between the upper spiral conveyers and heated up by suitable gas-pipes, so that the soldering material is kept in liquid condition, as shown in Fig. 1. When the cans have passed through the entire length of the soldering trough the rims are covered with solder. The cans are then conducted one after the other by the vertical conveyers to the lower platforms B², B⁴ and moved standing on end over the same by the lower conveyers C² and C⁴ to the ingoing end of the machine. During the passage of the cans over the lower platform which is rectangular in shape and extending in horizontal direction from the supporting frame, the cans are moved in vertical position with the solder at the top and are cooled off during the transit. When the cans arrive at the ingoing end of the machine they are passed along the downwardly-conveying chute E' to an elevator (not shown in the drawings) which lifts them to an inclined chute E at the other side of the machine, and down the same they roll to the other platform B², where they are rolled along the acid-soldering troughs and soldering troughs by the upper spiral conveyer C³, so that the lower rims of the cans are soldered. The cans are then connected by the vertical spiral conveyer to the lower platform B⁴ and are cooled off. To prevent the crowding of the cans at the ingoing end of the spiral conveyers C', C³, radial arms N are arranged on the conveyer shafts to cause a regular forward feeding of the cans between the spiral convolutions of the conveyer, as shown clearly in Fig. 7. To enable the cans to pass along the conveyer-blade at the point where the shaft is supported on the bearings of the supporting frame A, a small wire or other like guide-piece O is attached to the end of one spiral section $a'$ and extended over to the end of the adjoining spiral-section $a^2$, as shown in Fig. 6, which arrangement facilitates the passage of the cans from one section to the other.

In my improved soldering machine the cans to be soldered are slowly conducted over the supporting platforms and uniformly dipped into the acid, so as to be reliably soldered in their passage along the troughs. The upper platforms are provided with suitable guide-flanges $m$ so as to permit the adjustment of the platforms by means of set-screws $m'$, for the cans of different kinds. The inner guide-flanges of the upper platforms are provided with slotted arms $n^2$, so that they can be adjusted at varying distances from the acid-soldering troughs, as shown in Fig. 2. The shafts by which power is imparted to the different spiral conveyers of the machine are arranged on the bracket step $r$ and neck bearings $r'$ of the independent standards R at that end of the machine where the cans are conveyed from the upper to the lower platforms, said standards and supporting bearings being clearly shown in Fig. 3. By my machine the soldering of the cans is accomplished in a steady and reliable manner, a large quantity being soldered in a short time, owing to the double arrangement of the machine, one at each side of the supporting frame.

Having thus described my invention, I claim as new and desire to secure by Letters Patent—

1. The combination, of an upper platform, having guide-flanges for same, a spiral conveyer above said platform, means for imparting rotary motion to the conveyer, a vertical spiral conveyer at one end of the platform, a downwardly-extending flanged guide-arm adjoining the vertical conveyer, a second platform below the upper platform and a spiral conveyer moving in opposite direction to the upper conveyer, so as to move the cans over the lower platform and produce thereby the cooling of the same, substantially as set forth.

2. The combination, of a platform, having guide-flanges for the cans, a rotary spiral conveyer above said platform, an acid-trough at the inner edge of said platform, an acid-tank connected by channels with the acid trough, and an acid vessel connected by an acid supply-pipe, and a vent-pipe with the tank, so as to keep up the proper level of the acid in the tanks and trough, substantially as set forth.

3. The combination, with inclined platforms having guide-flanges for the cans, spiral conveyers arranged above said platforms, means for imparting rotary motion to said conveyers, acid-troughs extending along the lower edges of said platforms, means for supplying the acid to said troughs, soldering troughs extending along the lower edge of the platform in line with the acid-troughs, a soldering tank extending transversely between said soldering troughs, and means for heating the soldering tank so as to keep up the supply of liquid solder to the soldering-troughs, substantially as set forth.

In testimony that I claim the foregoing as my invention I have signed my name in presence of two subscribing witnesses.

BENNET J. MALMFELT.

Witnesses:
PAUL GOEPEL,
CHARLES SCHROEDER.